(12) United States Patent
Nakao et al.

(10) Patent No.: US 10,581,121 B2
(45) Date of Patent: Mar. 3, 2020

(54) BALANCE CORRECTION CONTROL APPARATUS, BALANCE CORRECTION SYSTEM AND ELECTRIC STORAGE SYSTEM

(71) Applicant: NExT-e Solutions Inc., Tokyo (JP)

(72) Inventors: Fumiaki Nakao, Shizuoka (JP); Makoto Inoue, Kanagawa (JP)

(73) Assignee: NExT-e Solutions Inc., Tokyo (JP)

( * ) Notice: Subject to any disclaimer, the term of this patent is extended or adjusted under 35 U.S.C. 154(b) by 316 days.

(21) Appl. No.: 15/371,232

(22) Filed: Dec. 7, 2016

(65) Prior Publication Data

US 2017/0084959 A1  Mar. 23, 2017

Related U.S. Application Data

(63) Continuation of application No. PCT/JP2015/068352, filed on Jun. 25, 2015.

(30) Foreign Application Priority Data

Jun. 25, 2014 (JP) .................................. 2014-130748

(51) Int. Cl.
*H02J 7/00* (2006.01)
*H01M 10/42* (2006.01)
(Continued)

(52) U.S. Cl.
CPC ....... *H01M 10/425* (2013.01); *H01M 10/441* (2013.01); *H01M 10/482* (2013.01);
(Continued)

(58) Field of Classification Search
USPC ...................................................... 320/132
See application file for complete search history.

(56) References Cited

U.S. PATENT DOCUMENTS

| 5,889,385 | A | * | 3/1999 | Podrazhansky | ....... H02J 7/0016 |
| | | | | | 320/130 |
| 2013/0271068 | A1 | * | 10/2013 | Komoda | ............. H01M 10/482 |
| | | | | | 320/107 |
| 2014/0159665 | A1 | * | 6/2014 | Boehm | ............... B60L 11/1851 |
| | | | | | 320/119 |

FOREIGN PATENT DOCUMENTS

JP    2006-067742 A    3/2006
JP    2008-017605 A    1/2008
(Continued)

OTHER PUBLICATIONS

Office Action issued for counterpart Japanese Application No. 2014-130748, drafted by the Japan Patent Office dated Sep. 14, 2018.
(Continued)

*Primary Examiner* — Samuel Berhanu

(57) ABSTRACT

Provided is a balance correction control apparatus to control a balance correction apparatus designed to correct a balance between voltages of a first electric storage cell and a second electric storage cell connected in series based on a target setting for an SOC of each of the first electric storage cell and the second electric storage cell. The balance correction control apparatus includes a cell characteristic obtaining unit operable to obtain at least one cell characteristic selected from the group consisting of a degree of deterioration, a cell capacity and a temperature of each of the first electric storage cell and the second electric storage cell, and a target setting determining unit operable to determine the target setting for the SOC of each of the first electric storage cell and the second electric storage cell based on the at least one cell characteristic obtained by the cell characteristic obtaining unit.

10 Claims, 7 Drawing Sheets

(51) Int. Cl.
*H01M 10/48* (2006.01)
*H01M 10/44* (2006.01)

(52) U.S. Cl.
CPC ......... *H01M 10/486* (2013.01); *H02J 7/0019* (2013.01); *H02J 7/0021* (2013.01); *H02J 7/0047* (2013.01); *H01M 2010/4271* (2013.01); *H02J 2007/005* (2013.01)

(56) References Cited

FOREIGN PATENT DOCUMENTS

| JP | 2009-232660 A | 10/2009 |
| JP | 2012029417 A | 2/2012 |
| JP | 2012-138362 A | 7/2012 |
| JP | 2012-210109 A | 10/2012 |
| JP | 2012-213246 A | 11/2012 |
| JP | 2013-121303 A | 6/2013 |
| JP | 2014-171323 A | 9/2014 |
| WO | 2012/157747 A1 | 11/2012 |

OTHER PUBLICATIONS

Office Action issued for counterpart Chinese Application No. 201580030259.3, issued by the State Intellectual Property Office of People's Republic of China dated Oct. 22, 2018.

Office Action issued for counterpart Japanese Application 2014-130748, issued by the Japan Patent Office dated Feb. 6, 2018.

International Search Report for International Application No. PCT/JP20151/068352, issued by the Japan Patent Office dated Sep. 8, 2015.

* cited by examiner

| 500 | 510 | 520 | 530 | 540 | 550 |
|---|---|---|---|---|---|
| | ELECTRIC STORAGE CELL ID | RATED CAPACITY [Ah] | SOH [%] | TEMPERATURE [°C] | SOC TARGET VALUE [%] |
| | 120 | *** | 80 | 15 | 50 |
| | 120 | *** | 80 | 20 | 40 |
| | ... | ... | ... | ... | ... |
| | 122 | *** | 80 | 15 | 55 |
| | 122 | *** | 80 | 20 | 45 |
| | ... | ... | ... | ... | ... |
| | 124 | *** | 80 | 15 | 30 |
| | 124 | *** | 80 | 20 | 20 |
| | ... | ... | ... | ... | ... |

FIG. 5

BALANCE CORRECTION CONTROL APPARATUS, BALANCE CORRECTION SYSTEM AND ELECTRIC STORAGE SYSTEM

BACKGROUND

1. Technical Field

The present invention relates to a balance correction control apparatus, a balance correction system and an electric storage system.

The contents of the following Japanese patent application are incorporated herein by reference:

NO. 2014-130748 filed on Jun. 25, 2014.

The contents of the following PCT patent application are incorporated herein by reference:

NO. PCT/JP2015/068352 filed on Jun. 25, 2015.

2. Related Art

A balance correction circuit is proposed that is designed to correct the voltages between a number of electric storage cells connected in series (see Japanese Patent Application Publications Nos. 2006-067742, 2008-017605, 2009-232660 and 2012-210109).

Even if the voltages are corrected between the electric storage cells, variability may occur between the SOCs of the electric storage cells.

SUMMARY

According to a first aspect of the innovations herein, provided is a balance correction control apparatus to control a balance correction apparatus designed to correct a balance between voltages of a first electric storage cell and a second electric storage cell connected in series based on a target setting for an SOC of each of the first electric storage cell and the second electric storage cell. The above-described balance correction control apparatus may include a cell characteristic obtaining unit operable to obtain at least one cell characteristic selected from the group consisting of a degree of deterioration, a cell capacity and a temperature of each of the first electric storage cell and the second electric storage cell. The above-described balance correction control apparatus may include a target setting determining unit operable to determine the target setting for the SOC of each of the first electric storage cell and the second electric storage cell based on the at least one cell characteristic obtained by the cell characteristic obtaining unit.

In the above-described balance correction control apparatus, the target setting determining unit may determine the target setting in such a manner that the SOC of the first electric storage cell or the second electric storage cell increases as the degree of deterioration of the first electric storage cell or the second electric storage cell increases, as the temperature of the first electric storage cell or the second electric storage cell drops, or as the cell capacity of the first electric storage cell or the second electric storage cell decreases. In the above-described balance correction control apparatus, the first electric storage cell and the second electric storage cell may each generate a pulse-like discharge current.

In the above-described balance correction control apparatus, the target setting determining unit may determine the target setting in such a manner that the SOC of the first electric storage cell or the second electric storage cell decreases as the degree of deterioration of the first electric storage cell or the second electric storage cell increases, as the temperature of the first electric storage cell or the second electric storage cell drops, or as the cell capacity of the first electric storage cell or the second electric storage cell decreases. In the above-described balance correction control apparatus, the first electric storage cell and the second electric storage cell may be each applied with a pulse-like charge current.

In the above-described balance correction control apparatus, the target setting determining unit may determine the target setting of the SOC of each of the first electric storage cell and the second electric storage cell based on the at least one cell characteristic obtained by the cell characteristic obtaining unit and first correspondence information if the at least one cell characteristic obtained by the cell characteristic obtaining unit satisfies a predetermined first condition. In the above-described balance correction control apparatus, the target setting determining unit may determine the target setting of the SOC of each of the first electric storage cell and the second electric storage cell based on the at least one cell characteristic obtained by the cell characteristic obtaining unit and second correspondence information if the at least one cell characteristic obtained by the cell characteristic obtaining unit satisfies a predetermined second condition.

In the above-described balance correction control apparatus, the first correspondence information may represent, for each of the first electric storage cell and the second electric storage cell, a first relation between the at least one cell characteristic and a target setting of the SOC. In the above-described balance correction control apparatus, the second correspondence information may represent, for each of the first electric storage cell and the second electric storage cell, a second relation between the at least one cell characteristic and a target setting of the SOC.

According to a second aspect of the innovations herein, provided is a balance correction system including the above-described balance correction control apparatus, an SOC obtaining unit operable to obtain the SOCs of the first electric storage cell and the second electric storage cell, and a control unit operable to control the balance correction apparatus in such a manner that the SOC of each of the first electric storage cell and the second electric storage cell obtained by the SOC obtaining unit satisfies the target setting for the SOC of each of the first electric storage cell and the second electric storage cell determined by the target setting determining unit. The above-described balance correction system may further include the balance correction apparatus.

According to a third aspect of the innovations herein, provided is an electric storage system including the first electric storage cell and the second electric storage cell, and the above-described balance correction system. The above-described electric storage system may further include an SOC obtaining unit operable to obtain the SOCs of the first electric storage cell and the second electric storage cell, a switching element connected in series between a load and the first electric storage cell or between the load and the second electric storage cell, and a managing unit operable to turn on and off the switching element based on at least one of the SOCs of the first electric storage cell and the second electric storage cell obtained by the SOC obtaining unit.

The summary clause does not necessarily describe all necessary features of the embodiments of the present invention. The present invention may also be a sub-combination of the features described above.

BRIEF DESCRIPTION OF THE DRAWINGS

FIG. 5 schematically shows an exemplary data table 500.

DESCRIPTION OF EXEMPLARY EMBODIMENTS

Figure 1:
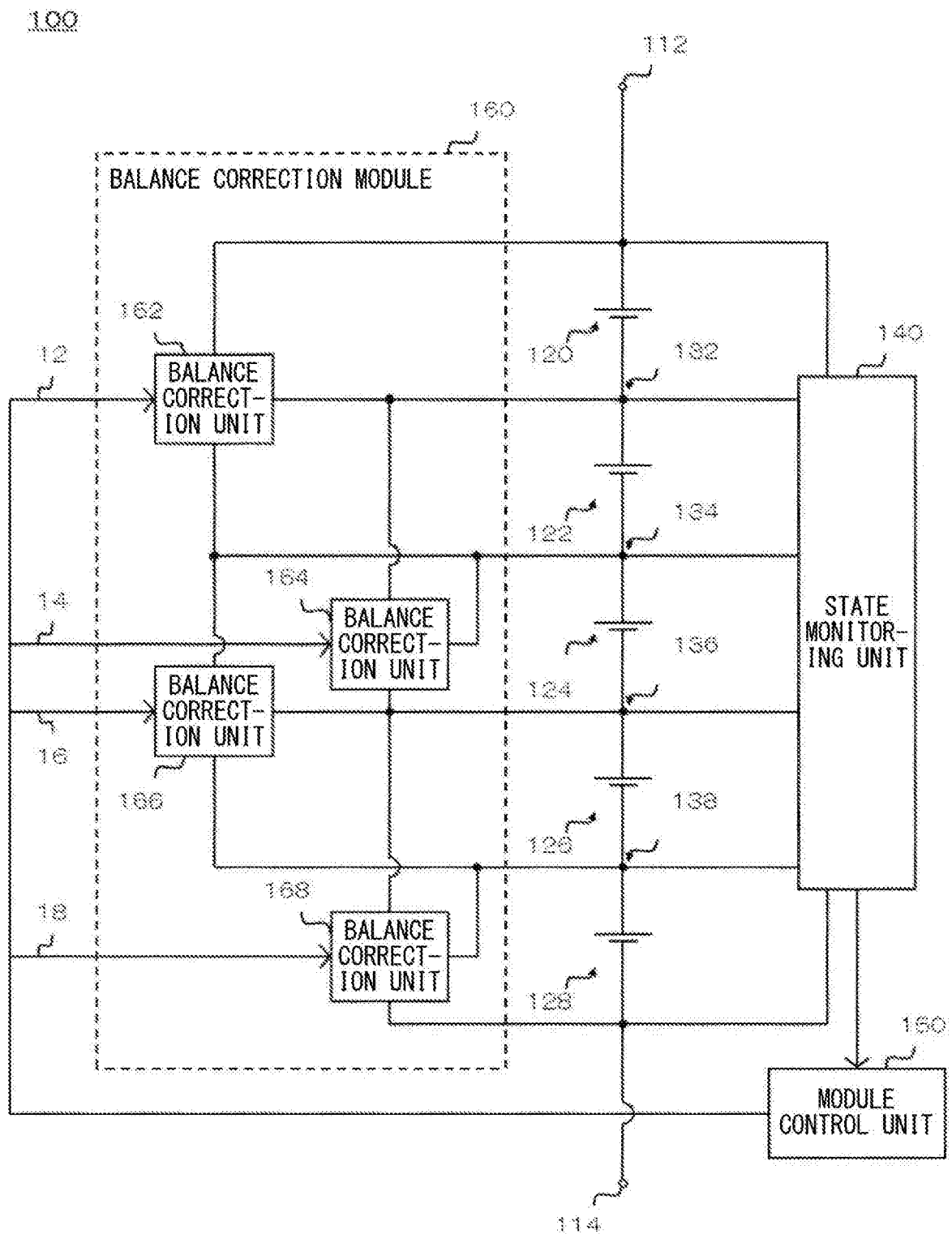
FIG. 1 schematically shows an exemplary internal structure of an electric storage system 100.

Hereinafter, some embodiments of the present invention will be described. The embodiments do not limit the invention according to the claims, and all the combinations of the features described in the embodiments are not necessarily essential to means provided by aspects of the invention. The embodiments will be described with reference to the drawings. Throughout the drawings, the identical or similar components may be assigned with the identical reference numerals and not be described redundantly.

FIG. 1 schematically shows an exemplary internal structure of an electric storage system 100. The electric storage system 100 is electrically connected to a load such as a motor (not shown) and feeds power to the load (this capability may be referred to as the discharge by the electric storage system). The electric storage system 100 is electrically connected to a charge device (not shown) and stores therein electric energy (this capability may be referred to as the charge by the electric storage system). The electric storage system 100 is utilized in, for example, electric vehicles, hybrid automobiles, electric motorcycle, railway vehicles, airplanes, elevating machines, transport devices such as cranes or electric appliances such as PCs and mobile phones.

In the present embodiment, the electric storage system 100 includes an external terminal 112, an external terminal 114, an electric storage cell 120, an electric storage cell 122, an electric storage cell 124, an electric storage cell 126, and an electric storage cell 128, a state monitoring unit 140, a module control unit 150 and a balance correction module 160. The balance correction module 160 has a balance correction unit 162, a balance correction unit 164, a balance correction unit 166 and a balance correction unit 168.

The electric storage cells 120 to 128 may be shown as an example of a plurality of electric storage cells or N (N is an integer equal to or larger than 3) electric storage cells. The electric storage cells 120 to 128 may each be shown as an example of a first or second electric storage cell. The state monitoring unit 140 may be shown as an example of a cell characteristic obtaining unit. The module control unit 150 may be shown as an example of a balance correction control apparatus or balance correction system. The module control unit 150 may be shown as an example of a managing unit.

The system including the module control unit 150 and the balance correction module 160 may be shown as an example of a balance correction system. The balance correction module 160 and the balance correction units 162 to 168 may each be shown as an example of a balance correction apparatus. The balance correction units 162 to 168 may be shown as an example of a plurality of balance correction units or N (N is an integer equal to or larger than 2) balance correction units.

Here, the reference to "electrically connected" is not limited to direct connection between a particular component and another component. A third component may intermediate between the particular component and the other component. In addition, the reference to "electrically connected" is not limited to physical connection between the particular component and the other component. For example, electrical connection is established between the input winding and the output winding in a transformer without physical connection therebetween. Furthermore, the reference to "electrically connected" does not only mean that the particular component is actually electrically connected to the other component but also means that electrical connection is established between the particular component and the other component in response to establishment of electrical connection between an electric storage cell and a balance correction unit. In addition, the reference to "connected in series" indicates that a particular component and another component are electrically connected in series and the reference to "connected in parallel" indicates that a particular component and another component are electrically connected in parallel.

The external terminals 112 and 114 are designed to electrically connect a device external to the system, such as a load and a charge device, to the electric storage system 100. The electric storage cells 120 to 128 are connected in series. At least one of the electric storage cells 120 to 128 may be a secondary cell or capacitor. At least one of the electric storage cells 120 to 128 may be a lithium ion cell. At least one of the electric storage cells 120 to 128 may include a plurality of electric storage cells therein that are connected in series or parallel.

In the present embodiment, the state monitoring unit 140 is designed to monitor the state of each of the electric storage cells 120 to 128. The state monitoring unit 140 may collect information regarding the state of each of the electric storage cells 120 to 128. The state monitoring unit 140 may transmit the collected information to the module control unit 150.

The information regarding the state of the electric storage cell can include, for example, the voltage value of the electric storage cell, the current value of the electric storage cell, the cell capacity of the electric storage cell, the temperature of the electric storage cell, the degree of deterioration of the electric storage cell, and the state of charge (SOC) of the electric storage cell. The state of the electric storage cell may be shown as an example of a cell characteristic.

The cell capacity of the electric storage cell can be, for example, the cell capacity achieved when the electric storage cell is fully charged and the rated cell capacity of the electric storage cell (may be referred to as the rated capacity). The temperature of the electric storage cell may be the temperature inside or on the surface of the electric storage cell, the temperature of the surrounding space of the electric storage cell, or the temperature of the component arranged around the electric storage cell. To measure the temperature of the electric storage cell, a sensor may be provided for each electric storage cell. Alternatively, the temperature measured by a single sensor may be used as the temperature of a plurality of electric storage cells.

The degree of deterioration of the electric storage cell is represented by the state of health (SOH), for example. The SOH [%] of the electric storage cell is represented as the deteriorated fully charged capacity [Ah]/the initial fully charged capacity [Ah]×100. The calculation or estimation of the SOH of the electric storage cell is not particularly limited. For example, the state monitoring unit 140 determines the SOH of the electric storage cell based on the direct current resistance value of the electric storage cell. The state monitoring unit 140 may determine the SOH of the electric storage cell based on the open circuit voltage value of the electric storage cell.

The SOC [%] of the electric storage cell is represented as the residual capacity [Ah]/the fully charged capacity [Ah]× 100. The calculation or estimation of the SOC of the electric storage cell is not particularly limited. For example, the state monitoring unit 140 determines the SOC of the electric storage cell based on the measurements of the voltage of the electric storage cell. The state monitoring unit 140 may determine the SOC of the electric storage cell based on the I-V characteristics of the voltage of the electric storage cell. The state monitoring unit 140 may determine the SOC of the electric storage cell based on the integrated value of the current value of the electric storage cell.

In the present embodiment, the state monitoring unit 140 is electrically connected to the external terminal 112, the external terminal 114, a connection point 132, a connection point 134, a connection point 136 and a connection point 138. The state monitoring unit 140 may be formed in the same chip as the balance correction module 160, or in a different chip than the balance correction module 160.

The module control unit 150 is designed to control the operations of the balance correction module 160 or each of the balance correction units 162 to 168. In the present embodiment, the module control unit 150 receives, from the state monitoring unit 140, the information regarding the state of each of the electric storage cells 120 to 128. The module control unit 150 determines, based on the information regarding the state of each of the electric storage cells 120 to 128, a target setting for the SOC of each of the electric storage cells 120 to 128. The target setting can be, for example, a preset value (may be referred to as a target value), a range of preset values (may be referred to as a preset range) and the like.

In the present embodiment, the module control unit 150 generates module control signals 12 to 18 to respectively control the balance correction units 162 to 168 based on the determined target setting for the SOC. The module control signals 12 to 18 may each include at least one of a signal indicative of the difference or ratio in voltage between the two electric storage cells that are to be subjected to the correcting operation by the corresponding balance correction unit (may be referred to as target cells), a signal designed to control when the corresponding balance correction unit is to operate, a signal indicative of the target setting for the SOC, a signal designed to control the charge transfer rate achieved by the corresponding balance correction unit, and a signal defining the operational mode of the corresponding balance correction unit.

The operational mode of the balance correction unit can be selected from, for example, (1) a normal mode in which the balance correction unit transfers the charges from one of the target cells having a higher voltage or SOC to the other electric storage cell, (2) a forward mode in which the balance correction unit transfers the charges from one of the target cells that is positioned closer to the external terminal 112 to the other electric storage cell, (3) a backward mode in which the balance correction unit transfers the charges from one of the target cells that is positioned closer to the external terminal 114 to the other electric storage cell, (4) a suspended mode in which the balance correction unit suspends the correcting operation.

The module control unit 150 may be implemented by hardware or software. Alternatively, the module control unit 150 may be implemented by a combination of hardware and software. For example, the module control unit 150 may be realized by a general-purpose information processing apparatus provided with, for example, a data processing device including CPU, ROM, RAM, communication interface and the like executing programs designed to control the balance correction module 160 and the like.

The programs that can be installed in a computer and are designed to cause the computer to function as part of the module control unit 150 relating to the present embodiment may include modules defining the operations of the respective components of the module control unit 150. Such programs or modules cooperate with the CPU and the like to cause the computer to function as the respective units of the module control unit 150.

By being read by the computer, the information processing described in the programs allows the software and the above-described various types of hardware resources to cooperate with each other. In this way, the information processing realizes specific means. Such specific means performs the operations or processing on the information suitable for the intended use of the computer in accordance with the present embodiment and can thus construct apparatuses unique to the intended use. The programs may be stored on computer readable media or storage devices connected to a network.

The balance correction module 160 transfers electric charges between the electric storage cells 120 to 128 based on the signal from the module control unit 150 during at least one of a charge cycle and a discharge cycle of the electric storage system 100. The balance correction module 160 may be constituted by a single chip or a plurality of chips.

The balance correction units 162 to 168 each correct the balance between the voltages or SOCs of the target cells. The balance correction units 162 to 168 may each correct the balance between the voltages or SOCs of two electric storage cells based on the target settings for the SOCs of the two electric storage cells.

The operational principles of the balance correction units 162 to 168 are not particularly limited. The balance correction units 162 to 168 are respectively active-type balance correction apparatuses, for example. An active-type balance correction unit may be a balance correction unit that can transfer electric charges between two electric storage cells via an inductor as disclosed in Japanese Patent Application Publication No. 2006-067742, or a balance correction unit that can transfer electric charges using a capacitor as disclosed in Japanese Patent Application Publication No. 2012-210109. The balance correction units 162 to 168 may be respectively passive-type balance correction apparatuses. A passive-type balance correction apparatus is designed to release unnecessary electric charges using an external resistance, for example.

The balance correction unit 162 operates based on a module control signal 12 and corrects the balance between the voltages or SOCs of the electric storage cells 120 and 122. For example, when the balance correction unit 162 is a circuit designed to transfer charges via an inductor, the balance correction unit 162 may include a first terminal, a second terminal, a third terminal and a signal input terminal. The first terminal is electrically connected to a terminal of the electric storage cell 120 that is closer to the external terminal 112, the second terminal is electrically connected to a terminal of the electric storage cell 122 that is closer to the external terminal 114, and the third terminal is electrically connected to the connection point 132 between the electric storage cell 120 and the electric storage cell 122. The signal input terminal receives the module control signal 12 from the module control unit 150.

Likewise, the balance correction unit 164 operates based on the module control signal 14 and corrects the balance between the voltages or SOCs of the electric storage cells 122 and 124. The balance correction unit 166 operates based on the module control signal 16 and corrects the balance between the voltages or SOCs of the electric storage cells 124 and 126. The balance correction unit 168 operates based on the module control signal 18 and corrects the voltages of the electric storage cells 126 and 128.

In the present embodiment, the module control unit 150, which is arranged outside the balance correction units, is configured to determine the target settings of the SOCs of the balance correction units. In other embodiments, the balance correction units may each have the same components as the module control unit 150 and determine the SOC target setting for themselves.

Figure 2:
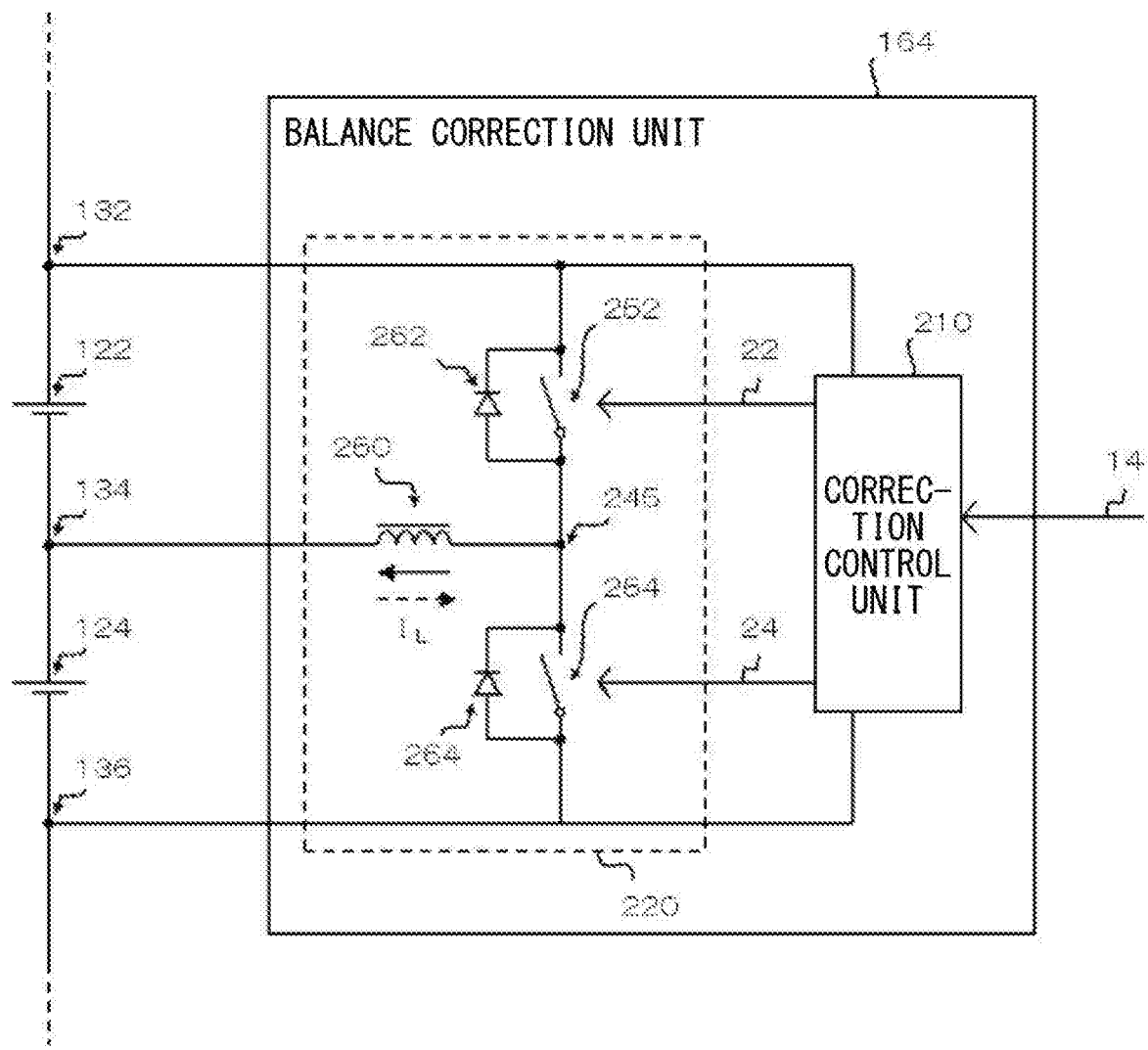
FIG. 2 schematically shows an exemplary internal structure of a balance correction unit 164.

FIG. 2 schematically shows an exemplary internal structure of the balance correction unit 164. Here, the balance correction unit 162, the balance correction unit 166 and the balance correction unit 168 may respectively have the same internal structures as the balance correction unit 164.

In the present embodiment, the balance correction unit 164 includes a correction control unit 210 and a correcting unit 220. The correcting unit 220 includes an inductor 250, a switching element 252, a switching element 254, a diode 262 and a diode 264. The balance correction unit 164 may include a voltage detector (not shown) to detect the voltages of the electric storage cells 122 and 124. The correction control unit 210 may be an exemplary control unit. The correcting unit 220 may be an exemplary balance correction apparatus.

In the present embodiment, the balance correction unit 164 is electrically connected to the positive side of the electric storage cell 122, to the connection point 134 between the negative side of the electric storage cell 122 and the positive side of the electric storage cell 124, and to the negative side of the electric storage cell 124. In this way, a first keying circuit is formed including the electric storage cell 122, the switching element 252 and the inductor 250. In addition, a second keying circuit is formed including the electric storage cell 124, the inductor 250 and the switching element 254. The electric storage cells 122 and 124 may be shown as an example of two adjacent electric storage cells.

The correction control unit 210 controls how the correcting unit 220 operates. The correction control unit 210 feeds a correction control signal 22 to the switching element 252. The correction control signal 22 is designed to turn on/off the switching element 252. The correction control unit 210 feeds a correction control signal 24 to the switching element 254. The correction control signal 24 is designed to turn on/off the switching element 254.

The correction control unit 210 may use a pulse generator, which is designed to generate a sequence of pulses of a predetermined period, in order to generate the correction control signal 22 and the correction control signal 24. The pulse generator may be a variable pulse generator to variably control the duty ratio of at least one of the correction control signal 22 and the correction control signal 24. The duty ratio can be calculated as the percentage of the ON period relative to the period of the square wave.

The correction control unit 210 may feed the correction control signal 22 and the correction control signal 24 in such a manner that the switching element 252 and the switching element 254 are alternately and repeatedly turned on and off. In this manner, a switching operation can be repeatedly performed to alternately switch between the state in which currents flow through the first keying circuit and the state in which currents flow through the second keying circuit.

The correction control unit 210 may feed the correction control signal 22 and the correction control signal 24 to the switching element 252 and the switching element 254 in such a manner that the balance correction unit 164 repeatedly performs the switching operation with predetermined periods. Here, the reference to "the predetermined period" includes not only a case where the switching operation is has a predetermined repetition period but also a case where the period is variably controlled in some way. For example, the reference to "the predetermined period" also includes a case where a particular algorithm is used to determine the period for the next cycle.

In the present embodiment, the switching operation may include a first operation to turn on a first one of the switching elements 252 and 254 and turn off a second one of the switching elements 252 and 254, and a second operation to turn off the first one of the switching elements 252 and 254 and turn on the second one of the switching elements 252 and 254. In addition to the first operation and the second operation, the switching operation may also include a third operation to turn off both of the switching elements 252 and 254. The order of the first, second and third operations may be arbitrarily determined, but the second operation preferably follows the first operation. Here, the switching operation may include other operations.

The correction control unit 210 receives a module control signal 14 from the module control unit 150. The correction control unit 210 may base the module control signal 14 to determine at least one of the start and suspension of a correcting operation.

In one embodiment, the module control signal 14 includes a signal defining the operational mode of the balance correction unit 164 (may be referred to as a mode selection signal). For example, when the mode selection signal selects one of the normal mode, the forward mode and the backward mode, the correction control unit 210 generates a correction control signal 22 and a correction control signal 24 that controls the balance correction unit 164 to operate in the operational mode selected by the mode selection signal and allows the balance correction unit 164 to start the correcting operation. For example, when the mode selection signal selects the suspended mode, the correction control unit 210 generates a correction control signal 22 to turn off the switching element 252 and a correction control signal 24 to turn off the switching element 254 and suspends the correcting operation by the balance correction unit 164.

In other embodiments, the module control signal 14 includes a target setting for the SOC or voltage of the electric storage cell 122 and a target setting for the SOC or voltage of the electric storage cell 124. The target setting for the voltage of the electric storage cell 122 may be determined based on the target setting for the SOC of the electric storage cell 122. In this way, the SOC of the electric storage cell 122 can be regulated by regulating the voltage of the electric storage cell 122. The correction control unit 210 obtains, for example, from the state monitoring unit 140 the SOC or voltage of the electric storage cell 122 and the SOC or voltage of the electric storage cell 124. The correction control unit 210 controls the balance correction unit 164 to operate if the SOC or voltage of the electric storage cell 122 obtained from the state monitoring unit 140 satisfies the target setting for the SOC or voltage of the electric storage cell 122 included in the module control signal 14 and if the SOC or voltage of the electric storage cell 124 obtained from the state monitoring unit 140 satisfies the target setting for the SOC or voltage of the electric storage cell 124 included in the module control signal 14, and controls the balance correction unit 164 to stop otherwise.

The correction control unit 210 may generate the correction control signal 22 and the correction control signal 24 based on the module control signal 14. For example, the correction control unit 210 determines the duty ratios for the correction control signal 22 and the correction control signal 24 based on the module control signal 14 and generates the correction control signal 22 and the correction control signal 24 having the determined duty ratios.

In one embodiment, the module control signal 14 includes a target setting for the SOC of the electric storage cell 122 and a target setting for the SOC of the electric storage cell 124. For example, the correction control unit 210 determines the duty ratios for the correction control signal 22 and the correction control signal 24 in such a manner that the SOC of the electric storage cell 122 satisfies the target setting for the SOC of the electric storage cell 122 included in the module control signal 14 and the SOC of the electric storage cell 124 satisfies the target setting for the SOC of the electric storage cell 124 included in the module control signal 14.

In other embodiments, the module control signal 14 includes a target setting for the voltage of the electric storage cell 122 and a target setting for the voltage of the electric storage cell 124. The correction control unit 210 determines the duty ratios for the correction control signal 22 and the correction control signal 24 in such a manner that the voltage of the electric storage cell 122 satisfies the target setting for the voltage of the electric storage cell 122 included in the module control signal 14 and the voltage of the electric storage cell 124 satisfies the target setting for the voltage of the electric storage cell 124 included in the module control signal 14.

The target setting for the voltage of the electric storage cell 122 may represent the voltage value or range of voltages of the electric storage cell 122 at the completion of the correcting operation, or the difference or ratio in voltage between the electric storage cell 122 and the electric storage cell 124 at the completion of the correcting operation. Likewise, the target setting for the voltage of the electric storage cell 124 may represent the voltage value or range of voltages of the electric storage cell 124 at the completion of the correcting operation, or the difference or ratio in voltage between the electric storage cell 122 and the electric storage cell 124 at the completion of the correcting operation.

In other embodiments, the module control signal 14 includes information indicative of the duty ratios of the correction control signal 22 and the correction control signal 24. The correction control unit 210 determines the duty ratios of the correction control signal 22 and the correction control signal 24 based on the information indicative of the duty ratios of the correction control signal 22 and the correction control signal 24 included in the module control signal 14.

The inductor 250 is connected in series to the electric storage cell 122 and the switching element 252 between the electric storage cell 122 and the switching element 252 and transfers the charges between the electric storage cell 122 and the electric storage cell 124. In the present embodiment, one end of the inductor 250 is electrically connected to the connection point 134 between the electric storage cell 122 and the electric storage cell 124. The other end of the inductor 250 is electrically connected to the connection point 245 between the switching element 252 and the switching element 254.

Inductor current $I_L$ is generated in the inductor 250 by alternately turning on and off (may be referred to as turning on/off) the switching element 252 and the switching element 254 repeatedly. This enables electric energy to be exchanged between the electric storage cell 122 and the electric storage cell 124 via the inductor. Consequently, the balance between the voltages or SOCs of the electric storage cell 122 and the electric storage cell 124 can be corrected.

The switching element 252 is electrically connected between the other end of the inductor 250 and the positive side of the electric storage cell 122. The switching element 252 receives the correction control signal 22 from the correction control unit 210 and is turned on or off based on the correction control signal 22. In this way, the first keying circuit is opened or closed. The switching element 252 may be a transistor such as a MOSFET.

The switching element 254 is electrically connected between the other end of the inductor 250 and the negative side of the electric storage cell 124. The switching element 254 receives the correction control signal 24 from the correction control unit 210 and is turned on or off based on the correction control signal 24. In this way, the second keying circuit is opened or closed. The switching element 254 may be a transistor such as a MOSFET.

The diode 262 is arranged in parallel with the switching element 252 and guides currents from the other end of the inductor 250 to the positive side of the electric storage cell 122. The diode 264 is arranged in parallel with the switching element 254 and guides currents from the negative side of the electric storage cell 124 to the other end of the inductor 250. The diode 262 and the diode 264 may be each a parasitic diode that is equivalently formed between the source and the drain of a MOSFET.

The existence of the diode 262 and the diode 264 allows the inductor current $I_L$ to continue flowing through the diode 262 or diode 264 even if the inductor current $I_L$ remains during a period in which both the switching element 252 and the switching element 254 are turned off. This prevents the inductor current $I_L$ that has already been generated in the inductor 250 from being wasted. In addition, this feature can prevent generation of surge voltage, which may occur if the inductor current $I_L$ is shut off.

In the present embodiment, the correction control unit 210 of the balance correction unit 164 generates the correction control signal 22 and the correction control signal 24. However, the balance correction unit 164 is not limited to the present embodiment. In other embodiments, the balance correction unit 164 may not include the correction control unit 210. If such is the case, for example, the module control unit 150 may generate the correction control signal 22 and the correction control signal 24 and send the generated correction control signal 22 and correction control signal 24 to the switching element 252 and the switching element 254.

In the present embodiment, the module control unit 150 generates the module control signal 14, and the correction control unit 210 generates the correction control signal 22 and the correction control signal 24 based on the module control signal 14. However, the balance correction unit 164 is not limited to the present embodiment. In other embodiments, the correction control unit 210 may receive information from the state monitoring unit 140 and perform the same operations on the received information as performed by the module control unit 150 to generate the correction control signal 22 and the correction control signal 24.

In the present embodiment, the balance correction unit 164 corrects the voltages of the electric storage cell 122 and the electric storage cell 124. However, the balance correction unit 164 is not limited to the present embodiment. In other embodiments, the balance correction unit 164 may correct the voltages of two non-adjacent electric storage cells, for example, the electric storage cell 122 and the electric storage cell 128. In this case, one end of the inductor 250 is connected to the connection point between the electric storage cell 122 and the electric storage cell 128. The switching element 254 is electrically connected between the other end of the inductor 250 and the negative side of the electric storage cell 128.

In other embodiments, the balance correction unit 164 may correct the series voltage of the electric storage cell 122 and the electric storage cell 124, and the series voltage of the electric storage cell 124 and the electric storage cell 126. In this case, one end of the inductor 250 is connected to the connection point 134 between the electric storage cell 122 and the electric storage cell 124. In addition, the switching element 252 is electrically connected between the other end of the inductor 250 and the positive side of the electric storage cell 120, and the switching element 254 is electrically connected between the other end of the inductor 250 and the negative side of the electric storage cell 126.

Figure 3:
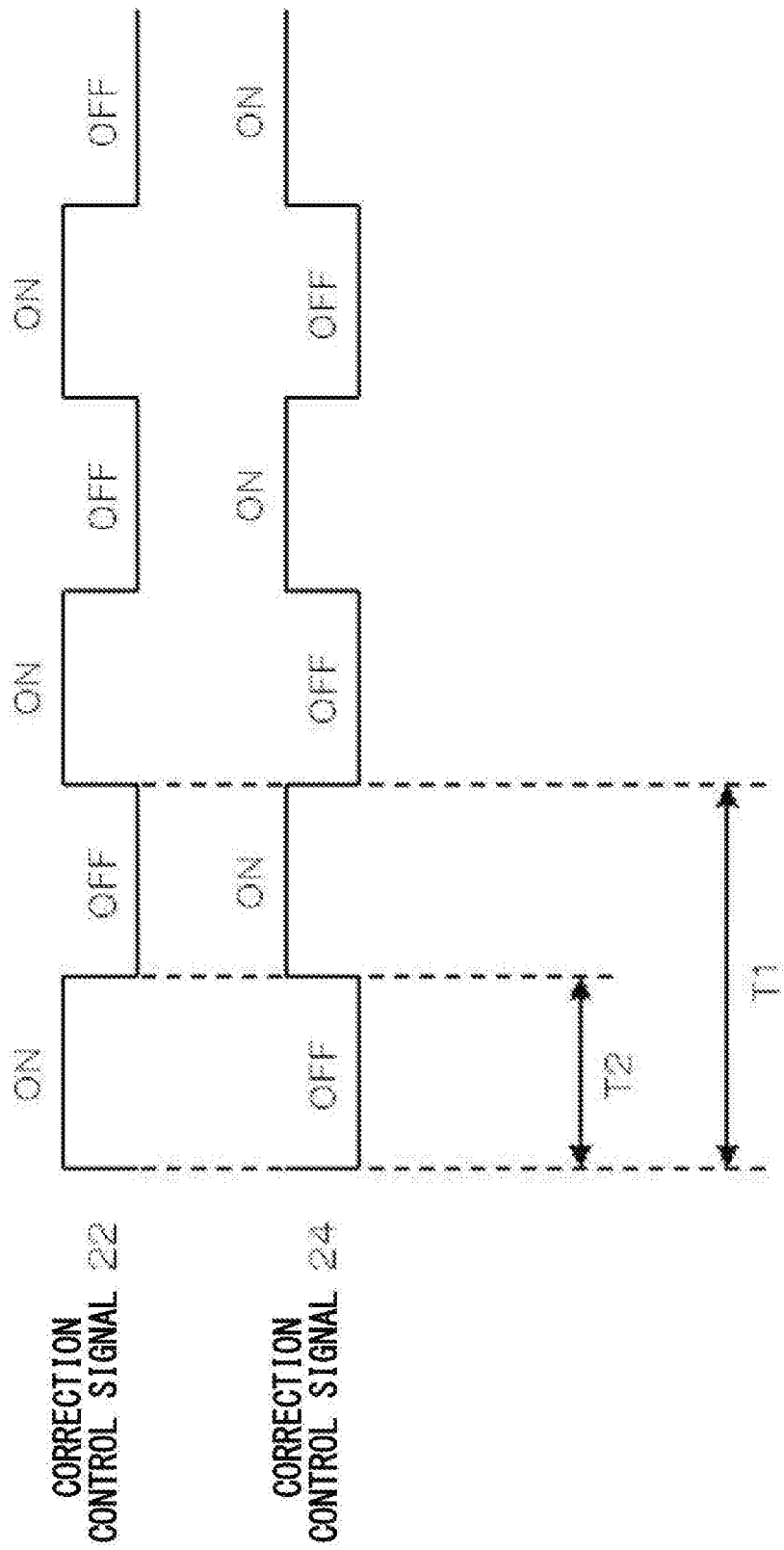
FIG. 3 schematically shows, as an example, a correction control signal 22 and a correction control signal 24.

FIG. 3 schematically shows, as an example, the correction control signal 22 and the correction control signal 24. As shown in FIG. 3, the correction control signal 22 and the correction control signal 24 are provided to alternately turn on and off the switching element 252 and the switching element 254 repeatedly. In the present embodiment, the duty ratio of the correction control signal 22 is represented as the ratio of the ON period $T_2$ relative to the clock cycle $T_1$ ($T_2/T_1$). The duty ratio of the correction control signal 24 is represented as the ratio of the ON period ($T_1-T_2$) relative to the clock cycle $T_1$ (($T_1-T_2$)/$T_1$).

Figure 4:
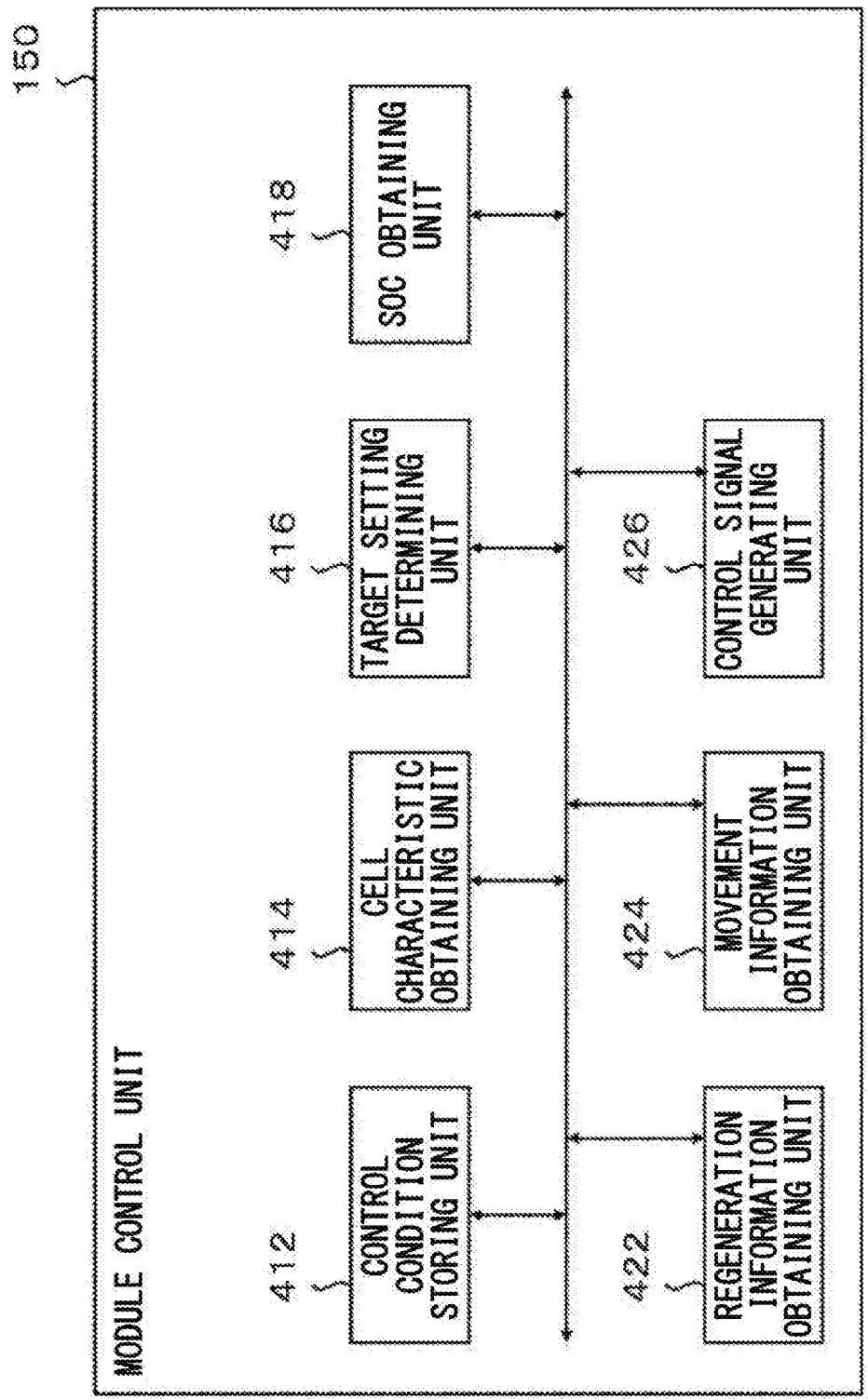
FIG. 4 schematically shows an exemplary internal structure of a module control unit 150.

FIG. 4 schematically shows an exemplary internal structure of the module control unit 150. In the present embodiment, the module control unit 150 includes a control condition storing unit 412, a cell characteristic obtaining unit 414, a target setting determining unit 416, a SOC obtaining unit 418, a regeneration information obtaining unit 422, a movement information obtaining unit 424 and a control signal generating unit 426. The respective components of the module control unit 150 may exchange information with each other. The control signal generating unit 426 may be an exemplary control or managing unit. In the present embodiment, the respective components of the module control unit 150 are described mainly based on an exemplary case where the module control unit 150 generates the module control signal 14 to control the balance correction unit 164.

The control condition storing unit 412 is designed to store therein control conditions. The control conditions may be information indicative of the criteria based on which determination is made when the control signal generating unit 426 attempts to generate various types of control signals. In one embodiment, the control conditions include information, for each of the electric storage cells 120 to 128, indicative of the relation between the state of each of the electric storage cells 120 to 128 and the target setting for the SOC of each of the electric storage cells 120 to 128 (the information may be referred to as correspondence information). The control conditions may include a plurality of pieces of correspondence information. The correspondence information may be a data table or function.

The cell characteristic obtaining unit 414 is designed to obtain, for each target cell, the information relating to the state of the electric storage cell. In the present embodiment, the cell characteristic obtaining unit 414 obtains, from the state monitoring unit 140, at least one cell characteristic selected from the group consisting of the degree of deterioration, cell capacity and temperature of each of the electric storage cell 122 and the electric storage cell 124. The cell characteristic obtaining unit 414 may obtain at least one cell characteristic selected from the group consisting of the degree of deterioration, cell capacity and temperature of each of the electric storage cell 122 and the electric storage cell 124, by using the information regarding the state of the electric storage cell obtained from the state monitoring unit 140 to calculate at least one cell characteristic.

The target setting determining unit 416 is designed to determine, for each target cell, the target setting for the SOC of the corresponding balance correction unit. In the present embodiment, the target setting determining unit 416 determines the target setting for the SOC of each of the electric storage cell 122 and the electric storage cell 124, to be used by the correction control unit 210, based on at least one cell characteristic obtained by the cell characteristic obtaining unit 414. For example, the target setting determining unit 416 determines the target setting for the SOC of each of the electric storage cell 122 and the electric storage cell 124, to be used by the correction control unit 210, based on at least one cell characteristic obtained by the cell characteristic obtaining unit 414 and on the control conditions stored in the control condition storing unit 412.

In one embodiment, the target setting determining unit 416 first refers to the data table storing therein the correspondence information and extracts the target setting for the SOC of the electric storage cell 122 that is associated with the cell characteristic of the electric storage cell 122 obtained by the cell characteristic obtaining unit 414. If the cell characteristic of the electric storage cell 122 obtained by the cell characteristic obtaining unit 414 is not associated with the target setting for the SOC of the electric storage cell 122 in the data table, the target setting determining unit 416 may perform appropriate interpolation to determine the target setting for the SOC of the electric storage cell 122. Subsequently, the target setting determining unit 416 determines the target setting for the SOC of the electric storage cell 124 according to the same procedure.

When the correspondence information is represented as a function of one or more cell characteristic, the target setting determining unit 416 determines the target setting for the SOC of the electric storage cell 122 by first substituting the one or more cell characteristics of the electric storage cell 122 obtained by the cell characteristic obtaining unit 414 into the function. Subsequently, the target setting determining unit 416 determines the target setting for the SOC of the electric storage cell 124 according to the same procedure.

In other embodiments, the target setting determining unit 416 determines the target setting for the SOC of each of the electric storage cell 122 and the electric storage cell 124 based on the correspondence information selected from a plurality of pieces of correspondence information stored in the control condition storing unit 412.

For example, if at least one cell characteristic obtained by the cell characteristic obtaining unit 414 satisfies a predetermined first condition, the target setting determining unit 416 determines the target setting for the SOC of each of the electric storage cell 122 and the electric storage cell 124 based on at least one cell characteristic obtained by the cell characteristic obtaining unit 414 and first correspondence information. If at least one cell characteristic obtained by the cell characteristic obtaining unit 414 satisfies a predetermined second condition, the target setting determining unit 416 determines the target setting for the SOC of each of the electric storage cell 122 and the electric storage cell 124 based on at least one cell characteristic obtained by the cell characteristic obtaining unit 414 and second correspondence information. Here, the first condition may be different from the second condition.

According to the predetermined first condition, at least one of the particular electric characteristics of the electric storage cell 122 and the electric storage cell 124 obtained by the cell characteristic obtaining unit 414 has a value larger or smaller than a predetermined first value, for example. Likewise, according to the predetermined second condition, at least one of the particular electric characteristics of the electric storage cell 122 and the electric storage cell 124 obtained by the cell characteristic obtaining unit 414 has a value larger or smaller than a predetermined second value, for example.

The target setting determining unit 416 may determine the target setting for the SOC of the electric storage cell 122 or electric storage cell 124 based on how the electric storage system 100 is used. In one embodiment, the target setting determining unit 416 may determine the target setting in such a manner that, as the degree of deterioration of the electric storage cell 122 or 124 increases, the SOC of the electric storage cell 122 or 124 increases. The target setting determining unit 416 may determine the target setting in such a manner that, as the temperature of the electric storage cell 122 or 124 drops, the SOC of the electric storage cell 122 or 124 increases. The target setting determining unit 416 may determine the target setting in such a manner that, as the cell capacity of the electric storage cell 122 or 124 decreases, the SOC of the electric storage cell 122 or 124 increases.

For example, when the electric storage system 100 is used as the power supply for an electric vehicle or hybrid automobile, the pulse-like discharge currents generated by the electric storage system 100 at the start of the electric vehicle or hybrid automobile are larger than the currents generated during steady operation. For example, the hybrid automobile can achieve significantly improved energy efficiency by using motors at the start. As described above, if the electric storage system 100 is used to generate the pulse-like discharge currents based on the electric storage cells included in the electric storage system 100, the target setting determining unit 416 may determine the target settings for the electric storage cells in the fashion described in the above-described embodiment.

In a different embodiment, the target setting determining unit 416 may determine the target setting in such a manner that, as the degree of deterioration of the electric storage cell 122 or 124 increases, the SOC of the electric storage cell 122 or 124 decreases. The target setting determining unit 416 may determine the target setting in such a manner that, as the temperature of the electric storage cell 122 or 124 drops, the SOC of the electric storage cell 122 or 124 decreases. The target setting determining unit 416 may determine the target setting in such a manner that, as the cell capacity of the electric storage cell 122 or 124 decreases, the SOC of the electric storage cell 122 or 124 decreases.

For example, when the electric storage system 100 is used to collect the regenerative energy in a crane to lift and lower an object, the pulse-like regenerative currents applied to the electric storage system 100 when the crane lowers the object are larger than the currents applied when the crane lifts the object. The electric storage system 100 collects the regenerative energy and uses the collected energy to lift a next object, which contributes to significantly improve the energy efficiency. As described above, when the electric storage system 100 is used to apply the pulse-like regenerative currents to the electric storage cells included in the electric storage system 100, the target setting determining unit 416 may determine the target settings for the electric storage cells in the fashion described in the above-described embodiment.

The SOC obtaining unit 418 obtains the SOCs of the electric storage cell 122 and the electric storage cell 124. For example, the SOC obtaining unit 418 obtains from the state monitoring unit 140 the SOCs of the electric storage cell 122 and the electric storage cell 124.

The regeneration information obtaining unit 422 obtains regeneration information indicative of the generation of regenerative currents by a load. The regeneration information obtaining unit 422 may obtain the regeneration information by receiving from the load a signal indicative of the generation of the regenerative currents. The regeneration information obtaining unit 422 may obtain the regeneration information in response to detection of the generation of pulse-like currents that may be generated during regeneration.

The movement information obtaining unit 424 obtains movement information indicative of movement of a load. The movement information obtaining unit 424 may obtain the movement information by receiving from the load a signal indicating movement of the load. The movement information obtaining unit 424 may obtain the movement information in response to detection of generation of pulse-like currents generated when the load moves.

The control signal generating unit 426 generates the module control signals 12 to 18. The module control signals 12 to 18 are respectively configured to control the operations of the balance correction units 162 to 168. For example, the module control signal 14 is configured to control the balance correction unit 164 in such a manner that the SOCs of the electric storage cell 122 and the electric storage cell 124 obtained by the SOC obtaining unit 418 satisfy the target settings for the SOCs of the electric storage cell 122 and the electric storage cell 124 determined by the target setting determining unit 416.

In the present embodiment, the control signal generating unit 426 generates a connection control signal designed to turn on and off a switching element that electrically connects the electric storage system 100 and the load together. The control signal generating unit 426 generates the connection control signal in order to control whether the above-mentioned switching element is turned on and off. The control signal generating unit 426 may control whether the above-mentioned switching element is turned on and off based on the SOC of at least one of the electric storage cells 120 to 128.

In one embodiment, the control signal generating unit 426 generates a connection control signal that turns off the above-mentioned switching element if the regeneration information obtaining unit 422 obtains the regeneration information. The control signal generating unit 426 may generate a connection control signal that turns off the above-mentioned switching element if the SOC of at least one of the electric storage cells 120 to 128 is higher than a predetermined value. This can prevent the electric storage cells included in the electric storage system 100 from being excessively charged.

In other embodiments, the control signal generating unit 426 generates a connection control signal that turns off the above-mentioned switching element if the movement information obtaining unit 424 obtains the movement information. The control signal generating unit 426 may generate a connection control signal that turns off the above-mentioned switching element if the SOC of at least one of the electric storage cells 120 to 128 is lower than a predetermined value. This can prevent the electric storage cells included in the electric storage system 100 from being excessively discharged.

FIG. 5 schematically shows an example of the data table 500. The data table 500 may be an example of the correspondence information stored on the control condition storing unit 412. In the present embodiment, the data table 500 stores, in association with each of one or more electric storage cells, an electric storage cell ID 510 of the corresponding electric storage cell, a rated capacity 520 of the corresponding electric storage cell, an SOH 530 of the corresponding electric storage cell, a temperature 540 of the corresponding electric storage cell, and an SOC target value 550 for the corresponding electric storage cell applied in the balance correcting operation. The electric storage cell ID 510 may be exemplary electric storage cell identification information to identify each of one or more electric storage cells. The rated capacity 520 may be an exemplary cell capacity. The SOH 530 may be an exemplary indicator of the degree of deterioration.

In one embodiment, as the rated capacity 520 decreases, the SOC target value 550 increases. As the SOH 530 decreases, the SOC target value 550 increases. As the temperature 540 decreases, the SOC target value 550 increases. In other embodiments, as the rated capacity 520 decreases, the SOC target value 550 decreases. As the SOH 530 decreases, the SOC target value 550 decreases. As the temperature 540 decreases, the SOC target value 550 decreases.

The data table 500 is not limited to the present embodiment. In other embodiments, the data table 500 stores, in association with each of one or more electric storage cells, at least one of the electric storage cell ID 510 of the corresponding electric storage cell, the rated capacity 520 of the corresponding electric storage cell, the SOH 530 of the corresponding electric storage cell and the temperature 540 of the corresponding electric storage cell, and the SOC target value 550 for the corresponding electric storage cell applied in the balance correcting operation.

Figure 6:
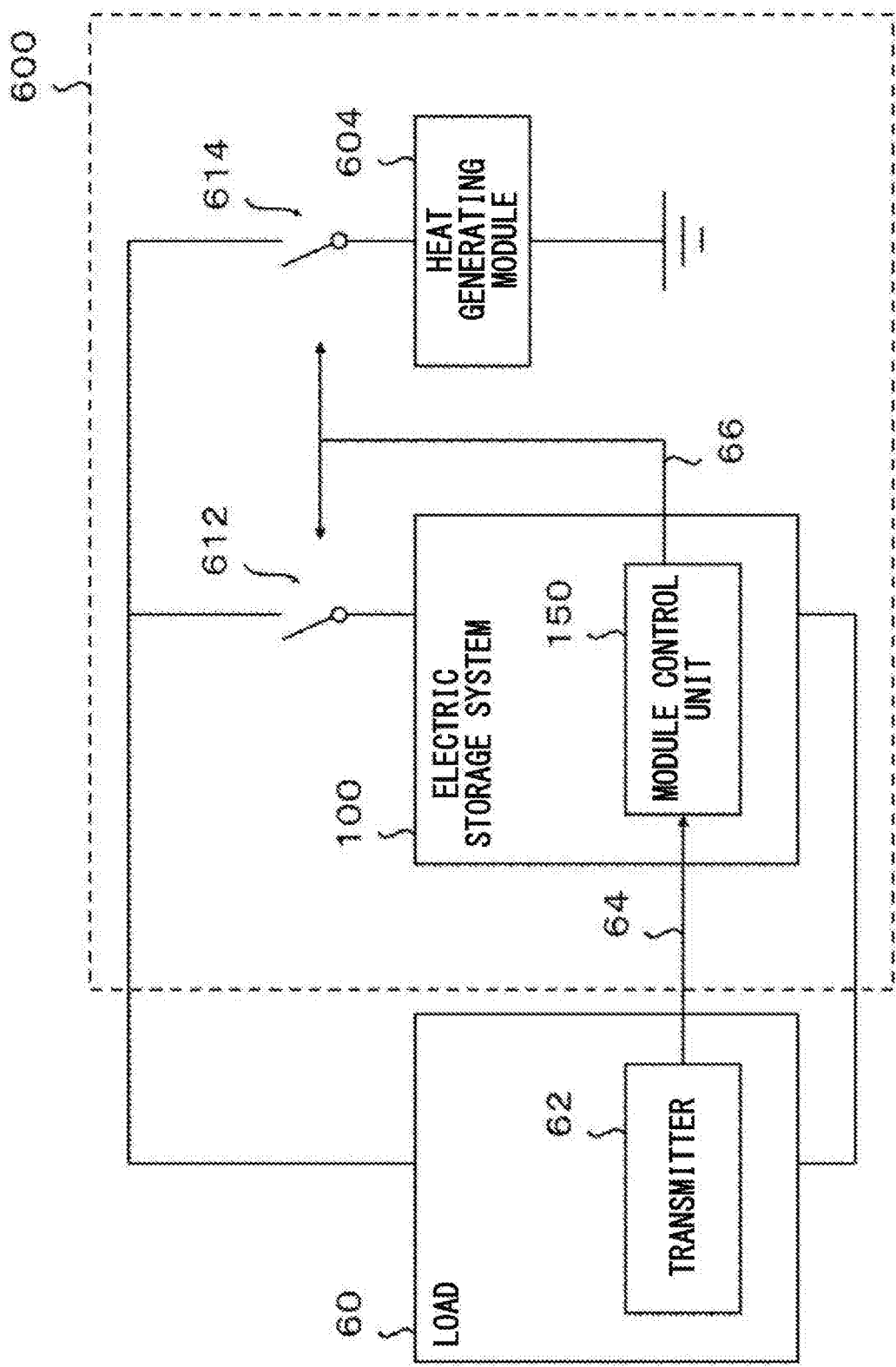
FIG. 6 schematically shows an exemplary electric storage system 600.

FIG. 6 schematically shows an exemplary electric storage system 600. The electric storage system 600 is electrically connected to a load 60. The electric storage system 600 feeds power to the load 60. The electric storage system 600 stores therein the regenerative currents from the load 60.

In the present embodiment, the load 60 includes a transmitter 62. The transmitter 62 transmits a signal 64 to the electric storage system 100. In one embodiment, the transmitter 62 transmits the signal 64 including the regeneration information indicative of the generation of regenerative currents if the regenerative currents may be possibly generated as a result of the operation of the load. In other embodiments, the transmitter 62 transmits the signal 64 including the movement information indicative of the movement of the load if the load may be possibly moved.

In the present embodiment, the electric storage system 600 includes the electric storage system 100, a heat generating module 604, a switching element 612 and a switching element 614. In the present embodiment, when the electric storage system 100 feeds power to the load 60, the module control unit 150 of the electric storage system 100 sends a connection control signal 66 to turn on the switching element 612 and to turn off the switching element 614.

In the present embodiment, when receiving the signal 64 including the regeneration information, the module control unit 150 sends, to the switching element 612 and the switching element 614, a connection control signal 66 to turn off the switching element 612 and to turn on the switching element 614. The module control unit 150 may send the connection control signal 66 if the SOC of at least one of the electric storage cells 120 to 128 is higher than a predetermined value.

The heat generating module 604 converts currents into heat. In the present embodiment, the heat generating module 604 is a resistance element, one of the ends of which is connected to the load 60 via the switching element 614 and the other of the ends of which is grounded.

The switching element 612 is arranged in series between the electric storage system 100 and the load 60. The switching element 612 establishes or cuts off the electrical connection between the electric storage system 100 and the load 60 based on the connection control signal 66. The switching element 614 is arranged in series between the heat generating module 604 and the load 60. The switching element 614 establishes or cuts off the electrical connection between the heat generating module 604 and the load 60 based on the connection control signal 66.

The electric storage system 600 can prevent excessive regenerative currents from flowing into the electric storage cells included in the electric storage system 100. As a result, the electric storage cells included in the electric storage system 100 can be prevented from being overly charged.

For example, when the electric storage system is provided in a hybrid automobile, regenerative currents are randomly generated. In order to collect as large regenerative currents as possible, it is necessary to operate the electric storage system with the SOCs of the electric storage cells included in the electric storage system being maintained at a relatively low level. If the SOCs of the electric storage cells included in the electric storage system are too low, however, it is difficult to supply sufficient power to the motor to start the hybrid automobile. If the motor is not provided with sufficient power, the engine needs to be started to start the hybrid automobile, which lowers the energy efficiency.

According to the present embodiment, excessive regenerative currents can be prevented from flowing into the electric storage system 100. Thus, the electric storage system 600 can operate with the SOCs of the electric storage cells included in the electric storage system 100 being maintained at a relatively high level. Therefore, the electric storage system 600 can supply sufficient power to the motor of the hybrid automobile at the start of the hybrid automobile. The hybrid automobile achieves significantly improved energy efficiency due to the use of the motor at the start of the hybrid automobile. Even if part of the regenerative energy fails to be collected, the energy efficiency is not affected very much. Therefore, by using the electric storage system 600 as the power supply of the hybrid automobile, the hybrid automobile can achieve significantly improved energy efficiency. In addition, the electric storage system 600 can be used more effectively even if some of the electric storage cells constituting the electric storage system 600 are deteriorated compared with the other electric storage cells.

Figure 7:
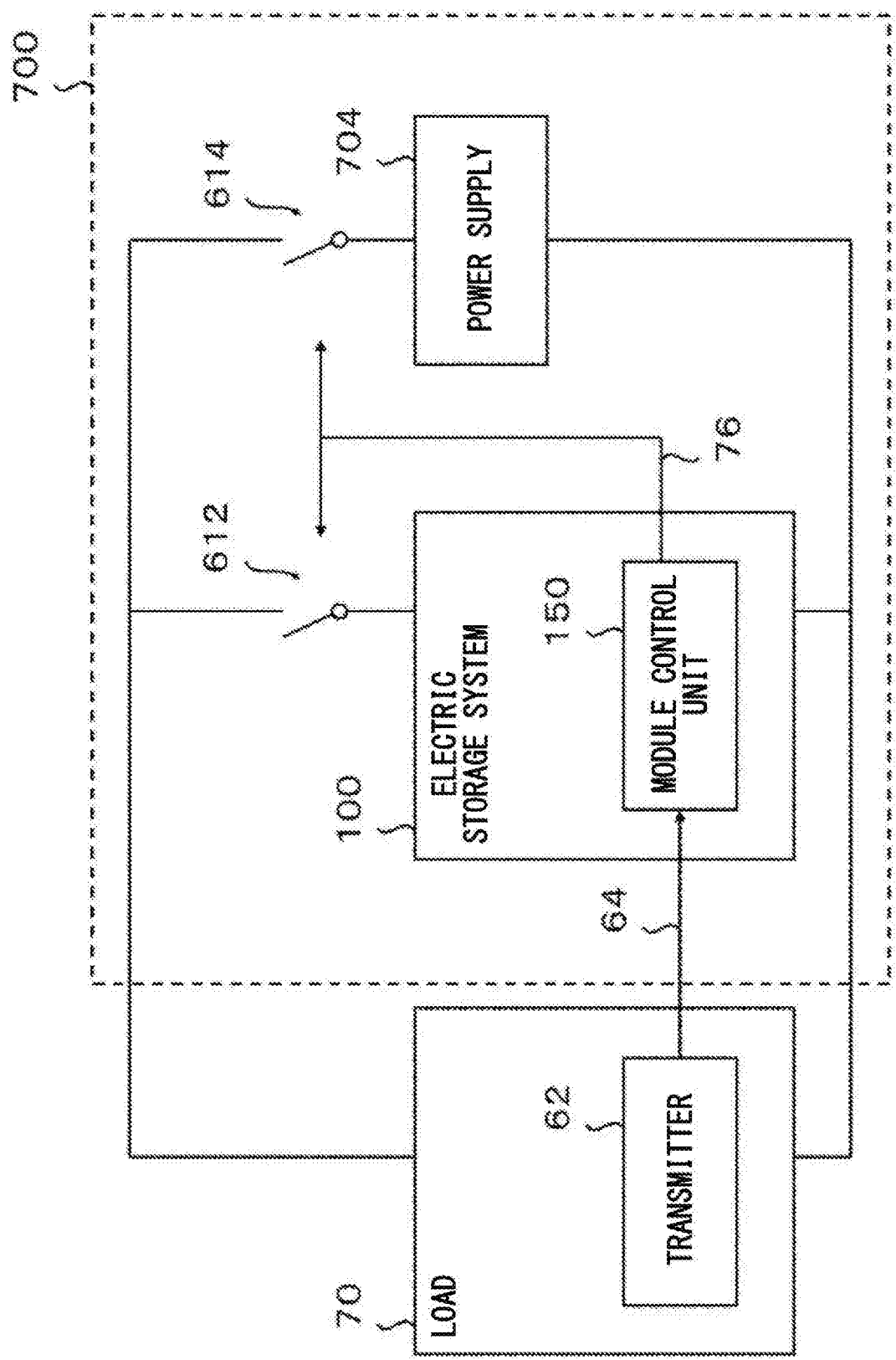
FIG. 7 schematically shows an exemplary electric storage system 700.

FIG. 7 schematically shows an exemplary electric storage system 700. The electric storage system 700 is electrically connected to the load 70. The electric storage system 700 feeds power to the load 70. The electric storage system 700 stores therein the regenerative currents from the load 70. In the present embodiment, the load 70 includes a transmitter 62.

In the present embodiment, the electric storage system 700 includes the electric storage system 100, a switching element 612, a switching element 614 and a power supply 704. In the present embodiment, the power supply 704 is connected to the load 70 and feeds power to the load 70. In the present embodiment, the switching element 614 is arranged in series between the power supply 704 and the load 60. The switching element 614 establishes or cuts off the electrical connection between the power supply 704 and the load 60 based on the connection control signal 66.

In the present embodiment, when the electric storage system 100 feeds power to the load 70, the module control unit 150 of the electric storage system 100 sends a connection control signal 66 to turn on the switching element 612 and to turn off the switching element 614. In the present embodiment, when receiving the signal 64 including the regeneration information, the module control unit 150 sends, to the switching element 612 and the switching element 614, a connection control signal 66 to turn on the switching element 612 and to turn off the switching element 614.

In this manner, the electric storage system 700 can collect the regenerative currents. Here, if the SOC of at least one of the electric storage cells 120 to 128 is higher than a predetermined value, the module control unit 150 may send, to the switching element 612 and the switching element 614, a connection control signal 66 to turn off the switching element 612 and to turn on the switching element 614.

In the present embodiment, the electric storage system 700 operates with the SOCs of the electric storage cells included in the electric storage system 100 being maintained at a relatively low level. Accordingly, the electric storage system 700 can collect more regenerative currents. In the present embodiment, in a case where the electric storage system 100 feeds power to the load 70, the module control unit 150 sends, to the switching element 612 and the switching element 614, a connection control signal 66 to turn off the switching element 612 and to turn on the switching element 614 if the SOC of at least one of the electric storage cells 120 to 128 is lower than a predetermined value. This enables the power supply 704 to feed power to the load 70.

For example, when the electric storage system is provided in a crane, the energy efficiency of the crane increases as the regenerative currents collected by the electric storage system increases. Here, the energy efficiency of the crane is not affected by whether the power used by the crane to lift an object is fed from the electric storage system or a different power supply. In the present embodiment, the electric storage system 700 operates with the SOCs of the electric storage cells included in the electric storage system 100 being maintained at a relatively low level. Accordingly, the electric storage system 700 can collect more regenerative currents. As a result, the crane can achieve improved energy efficiency.

While the embodiments of the present invention have been described, the technical scope of the invention is not limited to the above described embodiments. It is apparent to persons skilled in the art that various alterations and improvements can be added to the above-described embodiments. In addition, the features described in connection with a particular embodiment can be applied to other embodiments to such an extent that the application is not technically inconsistent. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

DESCRIPTION OF REFERENCE NUMERALS

12 . . . module control signal, 14 . . . module control signal, 16 . . . module control signal, 18 . . . module control signal, 22 . . . correction control signal, 24 . . . correction control signal, 60 . . . load, 62 . . . transmitter, 64 . . . signal, 66 . . . connection control signal, 70 . . . load, 100 . . . electric storage system, 112 . . . external terminal, 114 . . . external terminal, 120 . . . electric storage cell, 122 . . . electric storage cell, 124 . . . electric storage cell, 126 . . . electric storage cell, 128 . . . electric storage cell, 132 . . . connection point, 134 . . . connection point, 136 . . . connection point, 138 . . . connection point, 140 . . . state monitoring unit, 150 . . . module control unit, 160 . . . balance correction module, 162 . . . balance correction unit, 164 . . . balance correction unit, 166 . . . balance correction unit, 168 . . . balance correction unit, 210 . . . correction control unit, 220 . . . correcting unit, 245 . . . connection point, 250 . . . inductor, 252 . . . switching element, 254 . . . switching element, 262 . . . diode, 264 . . . diode, 412 . . . control condition storing unit, 414 . . . cell characteristic obtaining unit, 416 . . . target setting determining unit, 418 . . . SOC obtaining unit, 422 . . . regeneration information obtaining unit, 424 . . . movement information obtaining unit, 426 . . . control signal generating unit, 500 . . . data table, 510 . . . electric storage cell ID, 520 . . . rated capacity, 530 . . . SOH, 540 . . . temperature, 550 . . . preset value, 600 . . . electric storage system, 604 . . . heat generating module, 612 . . . switching element, 614 . . . switching element, 700 . . . electric storage system, 704 . . . power supply

What is claimed is:

1. A balance correction control apparatus to control a balance correction apparatus designed to correct a balance between voltages of a first electric storage cell and a second electric storage cell connected in series based on a target setting for an SOC of each of the first electric storage cell and the second electric storage cell, the balance correction control apparatus comprising:

a cell characteristic obtaining unit operable to obtain at least one cell characteristic selected from the group consisting of a degree of deterioration, a cell capacity and a temperature of each of the first electric storage cell and the second electric storage cell; and a target setting determining unit operable to determine the target setting for the SOC of each of the first electric storage cell and the second electric storage cell based on the at least one cell characteristic obtained by the cell characteristic obtaining unit, wherein the target setting determining unit determines the target settings for the SOC of the first electric storage cell and the second electric storage cell based on how an electric storage system including the first electric storage cell and the second electric storage is used, and (i) when the electric storage system is used to generate a discharge current by the first storage cell and the second storage cell in a case that a load of the electric storage system moves, the target setting determining unit determines the target setting in such a manner that the SOC of the first electric storage cell or the second electric storage cell increases as the temperature of the first electric storage cell or the second electric storage cell drops, or as the cell capacity of the first electric storage cell or the second electric storage cell decreases, and (ii) when the electric storage system is used to apply a regenerative current to the first storage cell and the second storage cell, the target setting determining unit determines the target setting in such a manner that the SOC of the first electric storage cell or the second electric storage cell decreases as the temperature of the first electric storage cell or the second electric storage cell drops, or as the cell capacity of the first electric storage cell or the second electric storage cell decreases.

2. The balance correction control apparatus as set forth in claim 1, wherein
the first electric storage cell and the second electric storage cell are configured to generate a pulsed discharge current.

3. The balance correction control apparatus as set forth in claim 1, wherein
the first electric storage cell and the second electric storage cell are configured to be applied with a pulsed charge current.

4. The balance correction control apparatus as set forth in claim 1, wherein
the target setting determining unit:
determines the target setting of the SOC of each of the first electric storage cell and the second electric storage cell based on the at least one cell characteristic obtained by the cell characteristic obtaining unit and first correspondence information if the at least one cell characteristic obtained by the cell characteristic obtaining unit satisfies a predetermined first condition; and
determines the target setting of the SOC of each of the first electric storage cell and the second electric storage cell based on the at least one cell characteristic obtained by the cell characteristic obtaining unit and second correspondence information if the at least one cell characteristic obtained by the cell characteristic obtaining unit satisfies a predetermined second condition,
the first correspondence information represents, for each of the first electric storage cell and the second electric storage cell, a first relation between the at least one cell characteristic and the target setting of the SOC, and
the second correspondence information represents, for each of the first electric storage cell and the second electric storage cell, a second relation between the at least one cell characteristic and the target setting of the SOC.

5. A balance correction system comprising:
the balance correction control apparatus as set forth in claim 1;
an SOC obtaining unit operable to obtain the SOCs of the first electric storage cell and the second electric storage cell; and
a control unit operable to control the balance correction apparatus in such a manner that the SOC of each of the first electric storage cell and the second electric storage cell obtained by the SOC obtaining unit satisfies the target setting for the SOC of each of the first electric storage cell and the second electric storage cell determined by the target setting determining unit.

6. The balance correction system as set forth in claim 5 further comprising the balance correction apparatus.

7. An electric storage system comprising:
the first electric storage cell and the second electric storage cell; and
the balance correction system as set forth in claim 5.

8. The electric storage system as set forth in claim 7, further comprising:
an SOC obtaining unit operable to obtain the SOCs of the first electric storage cell and the second electric storage cell;
a switching element connected in series between a load and the first electric storage cell or between the load and the second electric storage cell; and
a managing unit operable to turn on and off the switching element based on at least one of the SOCs of the first electric storage cell and the second electric storage cell obtained by the SOC obtaining unit.

9. An electric storage system comprising:
the first electric storage cell and the second electric storage cell; and
the balance correction system as set forth in claim 6.

10. The electric storage system as set forth in claim 9, further comprising:
an SOC obtaining unit operable to obtain the SOCs of the first electric storage cell and the second electric storage cell;
a switching element connected in series between a load and the first electric storage cell or between the load and the second electric storage cell; and
a managing unit operable to turn on and off the switching element based on at least one of the SOCs of the first electric storage cell and the second electric storage cell obtained by the SOC obtaining unit.

* * * * *